P. E. Hummel,
Scouring Leather,
No. 2,518, Reissued Mar. 19, 1867.
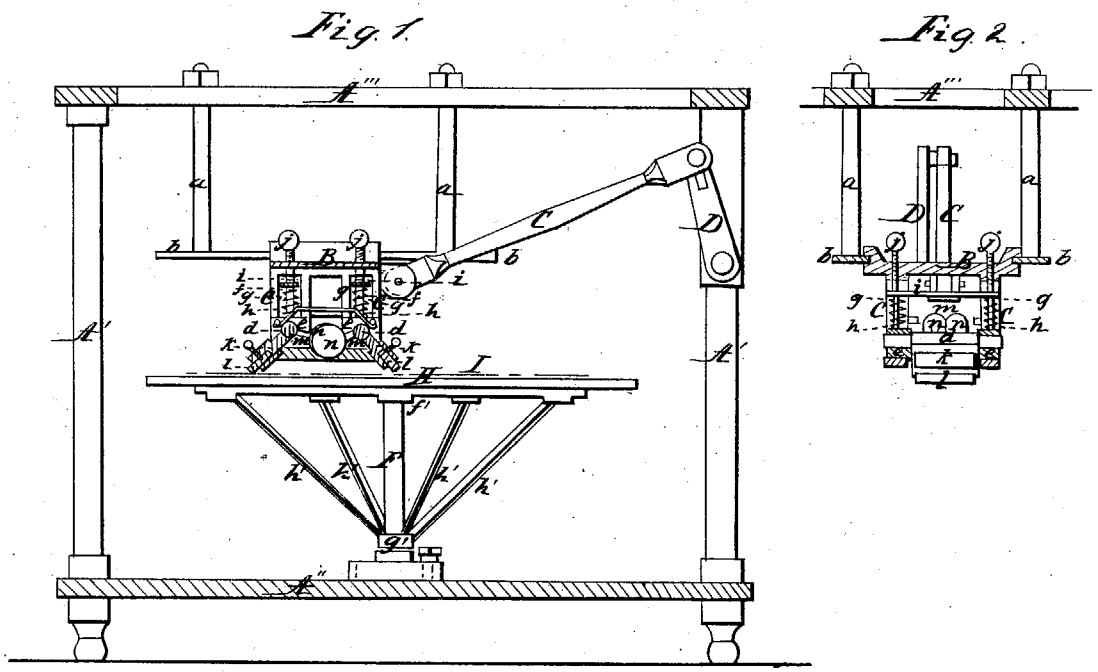
Witnesses:
Pliny Jewell
Jeremy W. Bliss
Inventor:
Peter E. Hummel
By P. Jewell & Son, Attorneys
N. PETERS, PHOTO-LITHOGRAPHER, WASHINGTON, D. C.

United States Patent Office.

P. JEWELL AND SONS, OF HARTFORD, CONNECTICUT, ASSIGNEES OF PETER E. HUMMEL.

*Letters Patent No.* 17,576, *dated June* 16, 1857; *reissue No.* 2,518, *dated March* 19, 1867.

IMPROVED MACHINE FOR SCOURING LEATHER.

The Schedule referred to in these Letters Patent and making part of the same.

TO ALL WHOM IT MAY CONCERN:

Be it known that PETER E. HUMMEL, of Pulaski, county of Oswego, and State of New York, did invent a new and useful Machine for Scouring Leather, in contradistinction of setting and finishing leather; and to enable others skilled in the art to make and use the same, we will proceed to describe, referring to the drawings, in which the same letters indicate like parts in each of the figures.

Figure 1 is a side view of this invention.

Figure 2 is a transverse section of the reciprocating head and guide-bars.

Figure 1 indicates the plane of section.

This invention consists in the employment or use of a reciprocating head provided with adjustable vibrating tool-stocks. It also consists in the employment or use of a horizontal, movable, oscillating, or rotating bed or table, the parts being arranged as will be hereinafter fully shown and described, whereby the process of scouring leather, hitherto performed by hand, may be accomplished in an expeditious and perfect manner.

A is a rectangular frame; A′ represents the walls of a building; A″ represents the floor of a building; A‴ represents truss or beam, to which the guide-ways are secured to afford a firm, steady support therefor, from which a framework or pendent rods, *a*, are secured. To the two lower ends of these rods guide-bars, *b b*, are attached, the two guides being parallel with each other, and having a plate, B, fitted between them, the sides of said plate being provided each with a groove in which the guide-bars *b* are fitted. To the under side of the plate B, and at each side thereof, a pendent frame, *c*, is secured, and the ends of two shafts, *d d*, are fitted in these frames *c*; the ends of the shafts *d* are fitted into bearings or boxes, *e*, which are placed and work in vertical slots, *f*, in the frames, and have spiral springs, *g*, bearing on their upper ends or edges, said springs being placed around vertical guide-rods or pins, *h*, attached to the bearings. The upper ends of the springs *g* have plates *i* placed upon them, and screws, *j*, which pass through the plate B, rest or bear upon said plates *i*, the springs *g* being more or less compressed, and their pressure upon the boxes or bearings *e* graduated as desired by turning the screws *j*. The shafts *d d* are allowed to vibrate or turn freely in their bearings. A socket, *k*, is attached to each shaft, *d*. These sockets *k* extend the whole length of the shaft, (between their bearings,) and the tools *l* are fitted within said sockets. These tools are constructed of the usual materials, stone or metal, and of the usual flat rectangular form. The shafts *d d* have each a rod, *m*, projecting radially from them. These rods *m* have screw-threads cut or formed on them, and weights, *n*, are fitted therein; said weights, by being turned, may be brought nearer to or further from the shafts *d d*, so that the tools may be counterpoised, and their weight or pressure graduated as may be desired. The shafts *d* are also allowed to yield or give, in consequence of being fitted in the yielding or sliding boxes or bearings *e*. A reciprocating motion is given the plate B by means of a connecting-rod, C, and crank, D, attached to a driving-shaft, E. F is a vertical arbor or shaft, which is permanently secured to the centre of the base G of the frame or floor A″. On this arbor or shaft a movable, oscillating, rotating, horizontal bed or table, H, is placed, the upper end of the arbor or shaft fitting in a socket, *f*, which is secured to the under side of the bed. A collar, *g′*, which is secured to rods *h′* attached to the under side of the bed, fits on the arbor or shaft F. The bed is allowed to turn freely on the arbor or shaft F, and the leather I to be operated upon is stretched out upon the bed H. A reciprocating motion is then given to the plate B, and consequently the tools *l*, by turning the driving-shaft E, and the leather is presented to the action of the tools, so that all parts will be properly acted upon by the movement of the bed H, or its substantial equivalent. By means of this invention leather may be "scoured" much more expeditiously than by the hand process. The tools are allowed to yield or give, and their pressure may be graduated with the greatest facility, and the work performed in a perfect manner.

We believe we have thus shown the nature, construction, and advantage of this invention, so as to enable others skilled to make and use the same therefrom.

What we claim, and desire to secure by Letters Patent, is—

1. In a "leather-scouring" machine a reciprocating tool-stock operated by a connecting-arm, C, crank, D, or their equivalents, to actuate the tools (arranged therein) successively upon the surface of the leather presented to their action.

2. We also claim in a "leather-scouring machine" a movable bed or table, upon which the leather is placed and held by atmospherical pressure, for presenting said leather to the action of reciprocating tools.

3. We also claim in a "leather-scouring machine" suspending the mechanism upon which the tool-stock reciprocates to trusses or timbers directly over the movable bed or table, so as to produce firmness and unobstructed access to the bed or table from all sides thereof.

4. We also claim in a "leather-scouring machine" an automatic reciprocating tool-stock, in combination with a horizontal movable bed or table for presenting the leather to the action of said tool-stock.

5. We claim in a "leather-scouring machine" a slitted lever, D, or its equivalent, in combination with the connecting-rod C and reciprocating tool-stock, to allow the back and forward movement of the said tool-stock to be extended or contracted more or less as desirable.

6. We also claim in a reciprocating head of a leather-"scouring" machine, so arranging the tools therein as to be adjusted, vibrate, counterpoise, and graduate their action for the purpose described, as may be desirable.

7. We claim the bearings *e* arranged in the tool-stock to impart yielding property to the vibrating tool-stock, for the purpose described.

P. JEWELL & SONS,
*Assignees of* PETER E. HUMMEL.

Witnesses:
PLINY JEWELL,
JEREMY W. BLISS.